(No Model.)

B. W. BURGHER.
HEDGE FENCE.

No. 418,308.   Patented Dec. 31, 1889.

Witnesses
John Smirie
H. T. Riley

Inventor
Benjamin W. Burgher
By his Attorneys,
C. A. Snow & Co.

UNITED STATES PATENT OFFICE.

BENJAMIN W. BURGHER, OF RUSSELLVILLE, KENTUCKY.

HEDGE FENCE.

SPECIFICATION forming part of Letters Patent No. 418,308, dated December 31, 1889.

Application filed July 16, 1889. Serial No. 317,673. (No model.)

*To all whom it may concern:*

Be it known that I, BENJAMIN W. BURGHER, a citizen of the United States, residing at Russellville, in the county of Logan and State of Kentucky, have invented a new and useful Hedge Fence, of which the following is a specification.

The invention relates to improvements in hedge fences.

The object of the present invention is to provide a hedge fence which will be strong and durable and require but little time and attention to keep in repair.

The invention consists in the construction and novel arrangement of parts hereinafter fully described, illustrated in the accompanying drawings, and pointed out in the claim hereto appended.

Figure 1:
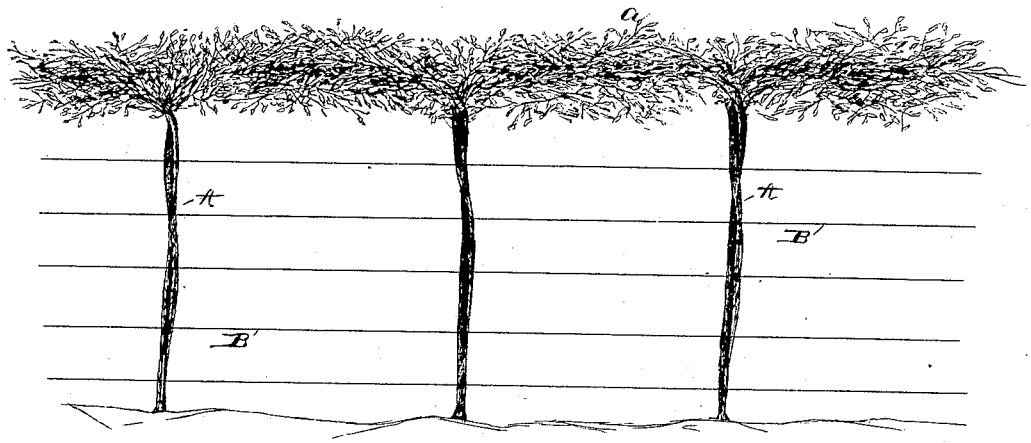
Figure 2:
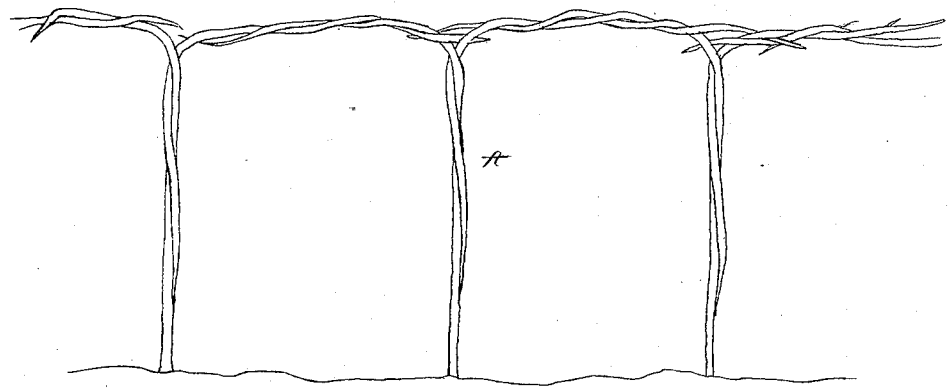

In the drawings, Figure 1 is a side elevation of a fence constructed in accordance with the invention, showing the hedge at the top. Fig. 2 is a similar view showing the manner of intertwining the plants.

Referring to the accompanying drawings by letter, A designates plants, which are preferably osage-orange, and are arranged in pairs at intervals of about four feet; but the distance between the plants may be varied according to the ground. The pairs of plants A, after having attained sufficient growth, are twisted together and run in opposite direction, and the branches of the meeting plants are intertwined, and a hedge a is formed at the top of the plants, the latter below the hedge being kept trimmed. By this construction a strong and durable framework adapted to receive wire fencing is produced.

The wires B are fastened to the plants A in the ordinary manner, and the plants, should they die or become destroyed in any way, may readily be replaced; and in constructing hedge fences it is always desirable to have a number of plants continually on hand for this purpose.

From the foregoing description and the accompanying drawings the construction and advantages of the invention will readily be understood.

What I claim is—

A hedge fence composed of plants arranged at intervals in pairs and twisted and trained in opposite directions, the meeting branches being intertwined to form a hedge at the top, and the horizontal wires arranged below the top, substantially as described.

In testimony that I claim the foregoing as my own I have hereto affixed my signature in presence of two witnesses.

BENJAMIN W. BURGHER.

Witnesses:
   JNO. W. CALDWELL,
   C. HENRY HARRISON.